Oct. 13, 1959   L. T. BRUEGGEMAN   2,908,176
Lubricant Seal
Filed July 5, 1957
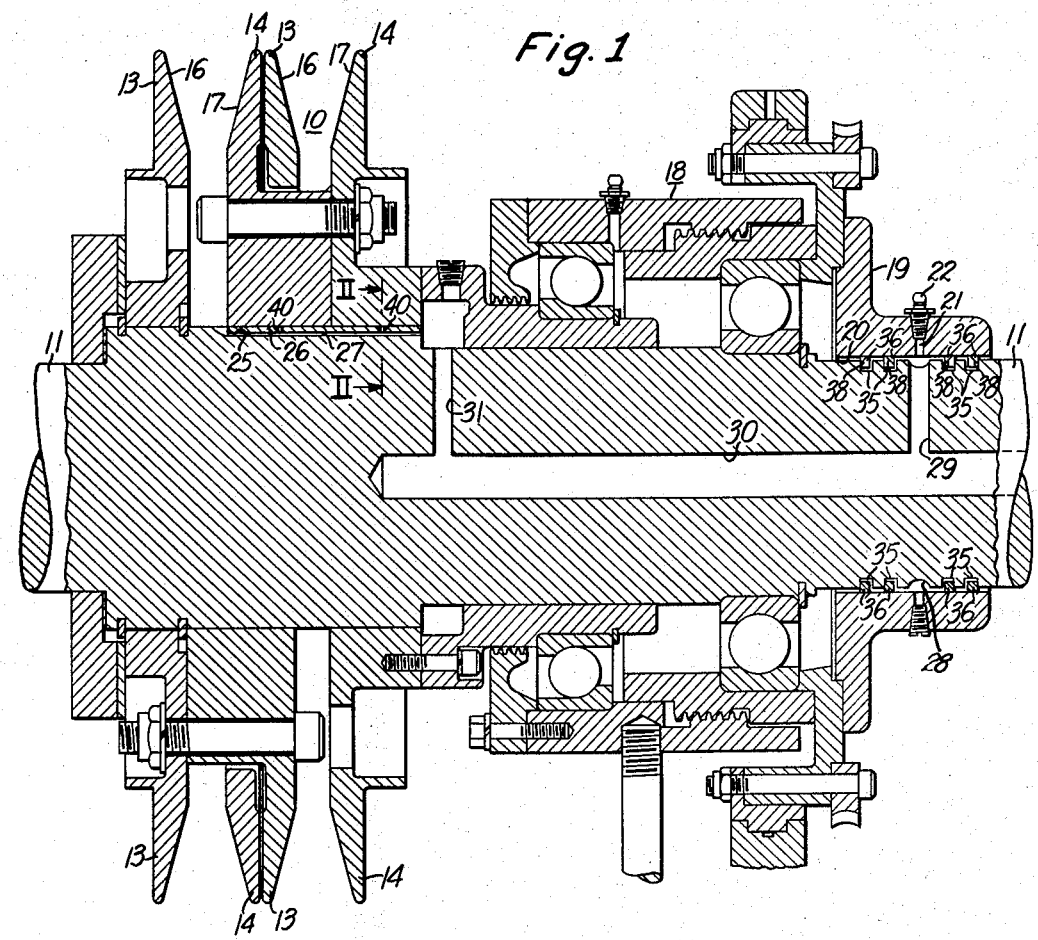
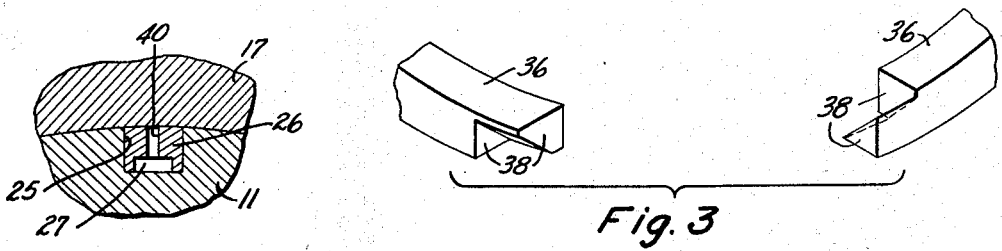
Inventor
Leslie T. Brueggeman
By Robert B. Benson
Attorney

United States Patent Office 2,908,176
Patented Oct. 13, 1959

2,908,176

LUBRICANT SEAL

Leslie T. Brueggeman, Cincinnati, Ohio, assignor to Allis-Chalmers Manufacturing Company, Milwaukee, Wis.

Application July 5, 1957, Serial No. 670,052

2 Claims. (Cl. 74—230.17)

This application relates generally to the lubrication of rotating elements. More specifically this invention relates to a seal for preventing lubricant leakage when supplying lubricant at high pressure to a rotating member through a stationary member.

In variable pitch diameter sheaves having axially movable disks forming belt engaging grooves, it is very important to keep these disks properly lubricated during the operation of the sheave. There has been considerable development of an improved lubrication system for lubricating the axially movable disks of the sheave while the sheave is in operation. One of the best systems of this kind calls for forcing the lubricant through axially extending channels in the power transmission member and then permitting the lubricant to be thrown radially outward by centrifugal force to the areas to be lubricated. In some such prior art arrangements, the lubricant has been inserted into the rotating power transmission member through a rotating lubricant fixture attached to the end of the rotating member. However rotating lubricant fixtures are often impractical because of the danger involved in forcing lubricant into the rotating grease fixture and the inaccessibility of the grease fittings in actual practice. Other arrangements for supplying lubricant to the rotating member include the forcing of lubricant through a stationary housing or some other relatively fixed structure into radial holes leading to a central axially extending channel in the rotating element. However, in such an arrangement there is often considerable leakage along the rotating element between the housing and the rotating element because of the high pressures required to force the lubricant into the radial holes.

The lubrication injection system of this invention overcomes the problems of the above mentioned systems by calling for an improved lubricant seal comprising spring sealing rings between the rotating element and the stationary member on either side of the lubricant fitting. The seals are typical piston rings and are fitted in annular grooves formed in the outer surface of the rotating element. The piston rings through their natural diametric tension are forced radially outward to the inner surface of the stationary member and the pressure from the lubricant being forced into the radial holes in the rotating element is high enough to force the piston rings to slide axially until they abut the sides of the grooves in the rotating element. Such an arrangement forms an excellent lubricant seal which prevents substantially any leakage of lubricant axially between the rotating element and the stationary member.

Therefore it is the object of this invention to provide a new and improved lubrication device.

Another object of this invention is to provide a new and improved lubricant seal.

Another object of this invention is to provide a new and improved lubricant seal for variable pitch diameter sheaves.

Other objects and advantages of this invention will be apparent from the following description when read in connection with the accompanying drawing, in which:

Fig. 1 is a cross section view of a sheave embodying the lubricant seal of this invention; and Fig. 2 is a cross section taken along the line II—II of Fig. 1; and Fig. 3 is a detailed view of the broken portion of the sealing rings shown in Fig. 1.

Referring now in particular to the drawing, the lubricant seal of this invention is illustrated in combination with a variable pitch diameter motion controlled sheave. A motion control sheave is a sheave in which the pitch diameter can be adjusted while the sheave is rotating. In the sheave 10 the shaft 11 constitutes a generally cylindrical power transmission element. Upon the shaft 11 are mounted sets of oppositely facing disks 13 and 14 with opposed frusto-conical faces 16 and 17. The disks 13 and 14 are connected to an adjusting mechanism 18 by suitable bolts and are relatively movable toward and away from each other to expand and contract the effective pitch diameter of the sheave with reference to a given size of V-belt or other interposed frictional drive element. The adjusting mechanism is designed to provide means for varying the pitch diameter of the sheave while the sheave is rotating.

A housing 19 having a smooth circular bore 20 is attached to the sheave adjusting mechanism 18 and surrounds the shaft 11. The shaft rotates relative to the 19 and the adjusting mechanism 18. A lubricant channel 21 extends from the bore 20 to the outside of the housing 19. A suitable lubricant fitting 22 is affixed to the housing in communication with the channel 21.

The shaft 11 is provided with longitudinally extending keyways 25, only one of which is shown, and undercut keys 26 positioned in the keyways 25 to cooperate with the keyways to form lubricant passageways 27. These passageways 27 are connected through suitable conduits to a cavity in the shaft shown as an annular groove 28 positioned adjacent the opening in the lubricant channel 21. Preferably as shown the annular groove is connected to a plurality of arcuately spaced radial holes 29, only one of which is shown. The holes 29 are in turn connected to channel 30 which extends axially in the shaft and connects with arcuately spaced radial holes 31 which are in communication with the lubricant passageways 27.

Circumferential rectangular shaped grooves 35 are cut into the cylindrical surface of the rotating shaft 11 on either side of the annular lubricant groove 28. Rectangular spring sealing rings 36 are positioned in the grooves 35. Although rectangular split sealing rings are illustrated and used, any other suitable spring sealing ring may be used. The rings 36 in their normal expanded position have a diameter slightly larger than the diameter of the bore 20 of the housing 19 so that the diametric tension of the ring will hold the ring against the bore of the housing during the operation of the sheave. The rings are broken at 38 and are preferably cut at different angles so as to form right or left hand joints.

By using a left hand joint ring and a right hand joint ring on either side of the lubricant channel, the seal will function independently of the direction of rotation of the shaft 11. The number of rectangular grooves and rings used on either side of the lubricant channel is determined by the pressure required to force the lubricant into the longitudinally extending lubricant passageways. In sheaves having a large number of disks, a very high lubricant pressure is required to force lubricant to the disks farthest from the grease fitting. As the lubricant pressure increases, the lubricant is more likely to leak along the shaft. Hence, more sealing rings are required to produce a satisfactory seal.

In operation, the rings 36 are positioned in the circumferential grooves 35 and the shaft positioned in the housing with the lubricant channel 21 aligned with the annular groove 28. The diametric tension of the rings 36 expands the rings into contact with the bore 20 of the housing 19. The diametric tension of the ring is sufficiently high to prevent the rings from rotating with the shaft 11 and low enough to allow the rings to slide axially in response to the pressure built up by the lubricant being forced into the channels in the shaft. When the rings have been forced into a sealing position against the sides of the grooves 35 the lubricant is forced through the radial holes 29, the channel 30, the radial holes 31, into the lubricant passageways 27 and hence through spaced metering holes 40 to the areas to be lubricated.

Although but one embodiment of this invention has been illustrated and described, it will be apparent to those skilled in the art that changes and modifications may be made without departing from the spirit of the invention or from the scope of the appended claims.

What is claimed is:

1. A lubrication device for a sheave comprising in combination a plurality of sheave disks mounted on a rotating shaft, a housing member having a bore surrounding said shaft, said shaft having an annular groove for receiving lubricant and conduits extending between said groove and said disks, said housing member defining a lubricant channel communicating with said annular groove, means for supplying lubricant under pressure through said channel to said groove, said shaft defining circumferential rectangular shaped grooves positioned on either side of said channel, and spring sealing rings disposed in said circumferential grooves to prevent lubricant leakage between said member and said shaft.

2. A lubrication device for a sheave comprising in combination a plurality of sheave disks mounted on a rotating shaft, a housing member having a bore surrounding said shaft, said shaft having an annular groove for receiving lubricant and conduits extending between said groove and said disks, said housing member defining a lubricant channel communicating with said annular groove, means for supplying lubricant under pressure through said channel to said groove, said shaft defining a pair of circumferential rectangular shaped grooves positioned on either side of said channel, and oppositely jointed rings disposed in said circumferential grooves to prevent lubricant leakage between said member and said shaft.

References Cited in the file of this patent

UNITED STATES PATENTS

| | | |
|---|---|---|
| 775,910 | Backstrom | Nov. 29, 1904 |
| 1,242,662 | Dunham | Oct. 9, 1917 |
| 2,034,666 | Reeves | Mar. 17, 1936 |
| 2,534,530 | Perry et al. | Dec. 19, 1950 |